United States Patent [19]

Steger

[11] 4,037,019

[45] July 19, 1977

[54] ACIDIC HYDROSOLS AND PROCESS FOR COATING THEREWITH

[75] Inventor: John F. Steger, Crystal Lake, Ill.

[73] Assignee: Morton-Norwich Products, Inc., Chicago, Ill.

[21] Appl. No.: 625,638

[22] Filed: Oct. 24, 1975

[51] Int. Cl.$^2$ .............................................. D02G 15/00
[52] U.S. Cl. ...................... 428/469; 106/74; 148/113; 252/63.5; 427/121; 427/126; 427/372 A; 427/379; 427/380; 428/471; 428/472
[58] Field of Search ............... 427/372, 379, 380, 121, 427/126, 327 A; 106/74; 252/63.5; 148/113; 428/469, 472, 471

[56] References Cited

U.S. PATENT DOCUMENTS

| | | | |
|---|---|---|---|
| 2,807,552 | 9/1957 | Robinson | 106/74 |
| 3,002,857 | 10/1961 | Stalego | 106/74 |
| 3,041,205 | 6/1962 | Iler | 427/380 |
| 3,078,186 | 2/1963 | Tierney | 427/372 A |
| 3,151,997 | 10/1964 | Harvey | 148/113 |
| 3,399,078 | 8/1968 | Bang | 427/379 |
| 3,479,201 | 11/1969 | Stoane | 427/380 |
| 3,706,596 | 12/1972 | Walloch | 427/379 |
| 3,847,583 | 11/1974 | Dislich et al. | 427/380 |

Primary Examiner—Ronald H. Smith
Assistant Examiner—Janyce A. Bell
Attorney, Agent, or Firm—Jack Axelrood

[57] ABSTRACT

Acidic hydrosols are provided for forming an electrically insulating and corrosion resistant coating on a substrate which consumes a minor quantity of acid from said hydrosol, said substrate being selected from the group consisting of metals higher than hydrogen in the electromotive series, porcelain, glass, wood, paper, cotton, plastics and hydrateable oxides.

The hydrosols of this invention are formed by admixing water, an acid such as phosphoric acid, or nitric acid, or hydrochloric acid or acetic acid or mixtures thereof, a metal silicate or hydrous magnesium silicate, and optionally, a magnesium compound and a boron compound. A significant feature of the present hydrosols is their water-white clarity and resistance to deterioration or decompositin for at least 15-20 minutes, and their ability to deposit a substantially uniform coating virtually instantaneously upon said substrates when placed in contact therewith.

36 Claims, No Drawings

ACIDIC HYDROSOLS AND PROCESS FOR COATING THEREWITH

BACKGROUND OF THE INVENTION

1. Field of the Invention

It is desirable to coat various substrates, but more particularly metal substrates, such as, for example, carbon steel, silicon steel and aluminum with a coating which will exhibit the following desirable properties:
 a. Adhesion sufficient to withstand slitting, stamping, and rubbing.
 b. Good dielectric properties.
 c. Hardness which is acceptable but easy on the life of cutting dies.
 d. Temperature resistance to 1600° F. or higher when the atmosphere is mildly oxidizing or reducing with the result that there is minimal deterioration of dielectric properties.
 e. Atmospheric corrosion resistance sufficient to prevent steel from rusting on prolonged exposure to plant atmosphere.
 f. Smooth coating texture to allow steel articles to slide over one another without dislodging the coating.

It is also desirable that said coating have the capability of being deposited instantaneously and uniformly from an aqueous system upon contact of said aqueous system with a substrate.

2. Description of the Prior Art

Several patents have been issued which disclose the use of silica or silicates and phosphate coatings for steel. For example, U.S. Pat. No. 3,138,492 discloses adherent, electrically insulating coatings when applied to iron strips or sheets. The coatings are formed from aqueous slurries containing phosphoric acid and 2 to 30% colloidal $SiO_2$.

Other patents which disclose the use of colloidal silica are U.S. Pat. No. 3,650,783 and Japanese Patent No. 7,406,742. In U.S. Pat. No. 3,650,783, the cation supplied is $C_r+^3$ which provides a composition quite different from the base coating of commercially available steel.

Japanese Pat. No. 7,406,742 discloses a phosphoric acid system to which an aluminum oxide solution and colloidal silica are added in combination.

U.S. Pats. Nos. 3,301,701 and 3,522,113 concern the direct addition of alkali metal silicates as coating compositions in an alkaline system.

Other patents which disclose the use of silicates which are not in a hydrosol form are German Pats. Nos. 1,264,924 and 2,347,728.

U.S. Pat. No. 3,214,302 discloses the application of an alkali metal silicate base coat on steel sheet followed by a top coat of phosphate or sexivalent chromium applied from an aqueous solution.

U.S.S.R. Pat. No. 157,587 discloses treatment of a steel surface with magnesium oxide followed by coating with an aqueous solution of phosphoric acid, or a phosphoric acid solution which may contain $(NH_4)_3PO_4$, $Mg(H_2PO_4)_2$ or $Al(H_2PO_4)_3$.

None of the above prior art patents provides an acidic hydrosol which has the property of instantaneously depositing a substantially uniform coating upon a variety of substrates when placed in contact therewith and which coating exhibits the desirable properties aforementioned.

It is, therefore, an object of the present invention to provide an acidic aqueous system which is capable of depositing a substantially uniform coating instantaneously upon a substrate when placed in contact therewith, said substrate being one which can consume minor quantities of acid from said system.

It is another object of this invention that said coating be one which exhibits the following desirable properties.
 a. Adhesion sufficient to withstand slitting, stamping, and rubbing.
 b. Good dielectric properties.
 c. Hardness which is acceptable but easy on the life of cutting dies.
 d. Temperature resistance to 1600° F. or higher when the atmosphere is mildly oxidizing or reducing with the result that there is minimal deterioration of dielectric properties.
 e. Atmospheric corrosion resistance sufficient to prevent steel from rusting on prolonged exposure to plant atmosphere.
 f. Smooth coating texture to allow steel articles to slide over one another without dislodging the coating.

It is a further object of this invention that the coating be of a relatively uniform weight per unit of substrate area and that said coating weight be independent of the time of contact between the aqueous system and the substrate.

It is another object of this invention that said coating be firmly bonded to the substrate and that when the coating is dried and subsequently heated it provides suitable dielectric properties.

It is another object of this invention that the coating not be reduced by the silicon present in silicon steels during stress relief annealing and that the coating not evaporate at the annealing temperatures conventionally employed in the art.

It is a still further object of this invention that said coatings can be stress relief annealed on soft magnetic silicon steels without the release of excessive quantities of water vapor which are deleterious to magnetic qualities.

It is yet another object of this invention that said coating can be applied successively to said substrates without the loss of the aforementioned desirable properties.

It is a further object of this invention that said coating act as a separator when coated steel articles are placed in laminated stacks and are stress relief annealed.

SUMMARY OF THE INVENTION

Broadly, the aforementioned objects are achieved by the present invention which provides an acidic hydrosol comprising the initial constituents water, an acid selected from the group consisting of phosphoric acid, nitric acid, hydrochloric acid and acetic acid, a metal silicate selected from the group consisting of alkali metal metasilicates having the formula $M_2SiO_3$, alkali metal orthosilicates having the formula $M_4SiO_4$, where M is sodium or potassium, and hydrous magnesium silicate, a magnesium compound selected from the group consisting of magnesium oxide and magnesium hydroxide, and a boron compound selected from the group consisting of boric oxide and boric acid, wherein said constituents are present in the following proportions:

| Constituent | Percent by Weight |
| --- | --- |
| (A) Water | About 43 to about 94 |
| (B) Acid | About 3 to about 51 |
| (C) Alkali metal metasilicate | 0 to about 16 |
| (D) Alkali metal orthosilicate | 0 to about 16 |
| (E) Hydrous magnesium silicate | 0 to about 18 |
| (F) Magnesium compound | 0 to about 6.6 |
| (G) Boron compound | 0 to about 1 | wherein:
when (C) is zero, then (D) is at least 1% and (F) is at least 0.5%;
when (D) is zero, then (C) is at least 1% and (F) is at least 0.5%;
when both (C) and (D) are each zero, then (E) is at least about 0.9%;
when (C) and (E) are each zero, then (D) is at least 1% and (F) is at least 0.5%;
when (D) and (E) are each zero, then (C) is at least 1% and (F) is at least 0.5%;
when (C) is zero, then (D) is greater than zero but less than 1% when (E) is at least 0.9%;
when (D) is zero, then (C) is greater than zero but less than 1% when (E) is at least 0.9%;
the concentration of phosphoric acid is that stoichiometric quantity which is required to react with either (C), (D) or (E), or with mixtures thereof to form silicic acid; and the ratio of $M_2O$ to $SiO_2$ is from about 1:1 to about 2:1.

This invention also provides a process for preparing an acidic hydrosol capable of depositing an electrically insulating and corrosion resistant coating onto a substrate which consumes a minor quantity of acid from said hydrosol, said substrate being selected from the group consisting of metals higher than hydrogen in the electromotive series, porcelain, glass, wood, paper, cotton, synthetic resins and hydrateable oxides, said process comprising admixing water with an acid selected from the group consisting of phosphoric acid, nitric acid, hydrochloric acid and acetic acid to form an aqueous acidic solution, and admixing with said solution until homogeneous a metal silicate selected from the group consisting of alkali metal metasilicates having the formula $M_2SiO_3$, alkali metal orthosilicates having the formula $M_4SiO_4$, where M is sodium or potassium, and hydrous magnesium silicate, a magnesium compound selected from the group consisting of magnesium oxide and magnesium hydroxide, and a boron compound selected from the group consisting of boric oxide and boric acid, wherein the proportions of said water, acid, metal silicate, magnesium compound and boron compound are as follows:

| | Percent by Weight |
| --- | --- |
| (A) Water | About 43 to about 94 |
| (B) Acid | About 3 to about 51 |
| (C) Alkali metal metasilicate | 0 to about 16 |
| (D) Alkali metal orthosilicate | 0 to about 16 |
| (E) Hydrous magnesium silicate | 0 to about 18 |
| (F) Magnesium compound | 0 to about 6.6 |
| (G) Boron compound | 0 to about 1 | wherein:
when (C) is zero, then (D) is at least 1% and (F) is at least 0.5%;
when (D) is zero, then (C) is at least 1% and (F) is at least 0.5%;
when both (C) and (D) are each zero, then (E) is at least about 0.9%;
when (C) and (E) are each zero, then (D) is at least 1% and (F) is at least 0.5%;
when (D) and (E) are each zero, then (C) is at least 1% and (F) is at least 0.5%;
when (C) is zero, then (D) is greater than zero but less than 1% when (E) is at least 0.9%;
when (D) is zero, then (C) is greater than zero but less than 1% when (E) is at least 0.9%;
the concentration of acid is at least the stoichiometric quantity required to react with either (C), (D), or (E), or with mixtures thereof to form silicic acid; and the ratio of $M_2O$ to $SiO_2$ is from about 1:1 to about 2:1 in said alkali metal metasilicates and orthosilicates.

This invention also provides a process for depositing an electrically insulating and corrosion resistant coating from an acidic hydrosol onto a substrate which consumes a minor quantity of acid from said hydrosol, said substrate being selected from the group consisting of metals higher than hydrogen in the electromotive series, porcelain, glass, wood, paper, cotton, synthetic resins and hydrateable oxides, said process comprising forming an acidic hydrosol as hereinbefore set forth, contacting said hydrosol with said substrate to form a coating thereon and heating said coated substrate to dry said coating thereon.

A hydrosol is here taken to mean a colloidal suspension of macromolecules, which suspension is water-white and clear to the eye. The acidic hydrosols of the present invention are self-plating and have the unique property of electroplating virtually instantaneously and substantially uniformly onto substrates that consume minor quantities of acid from the hydrosol composition, which substrates include metals higher than hydrogen in the electromotive series, such as for example, iron (including silicon steel and carbon steel) and aluminum and porcelain, glass, wood, paper, cotton, plastics and hydrateable oxides.

The wet plated coatings of this invention adhere tenaciously to said substrates. The coatings on metal become tougher and improve in texture and dielectric properties by first drying and then heat curing.

Coatings formed from the present acidic hydrosols may be formed upon soft magnetic silicon steels which coatings are stable to subsequent stress relief annealing temperatures up to about 1600° F. or more in either oxidizing or reducing atmospheres. Such coatings also act as an effective electrical insulation, and as an effective separator media for stacks of laminated steel sheet or for coiled, rolled steel sheet to prevent sticking or welding of the steel sheet to itself so that the steel can be separated or unrolled easily when desired. Coatings formed from the present hydrosols also provide resistance by the underlying coating to atmospheric corrosion. In this manner, steel, for example, is prevented from rusting on prolonged exposure to factory atmospheres. In addition, the present coatings have sufficient adhesion to withstand slitting, stamping and abrasion which is encountered in the usual coated-steel manufacturing operation.

Hydrosol stability for at least 15-20 minutes is regarded as a minimum requirement for commercial applications. The acidic hydrosols disclosed and claimed in this invention meet this stability requirement and generally exceed it by a large margin. Although the acid used may be phosphoric, nitric, acetic or hydrochloric, the preferred acid is phosphoric, especially when preparing coatings on ferrous substrates which are to withstand the high temperatures encountered in annealing.

The metal silicate can be introduced in the form of an alkali metal metasilicate, alkali metal orthosilicate, or in the form of hydrous magnesium silicate. In the alkali metal metasilicate form having the formula $M_2SiO_3$ where M is sodium or potassium, or in the alkali metal orthosilicate form having the formula $M_4SiO_4$, the ratio of $M_2O$ to $SiO_2$ is preferably from about 1:1 to about 2:1.

The alkali metal metasilicate or orthosilicate can be added directly to water containing one of the acids of the present invention, in which case a slight turbidity may be observed. However, this turbidity does not noticeably deteriorate the quality of the coatings prepared from such hydrosols. Alternately and preferably, the alkali metal metasilicate may be added as a water solution to a water solution of one of the acids employed in the present invention, whereupon a clear, water-white hydrosol is formed. The metal silicate can also be introduced in the form of a hydrous magnesium silicate having the formula $Mg_3Si_2O_5(OH)_4 \cdot 3H_2O$ in lieu of alkali metal metasilicate or orthosilicate. The hydrous magnesium silicate may be preformed by combining 3 moles of a magnesium salt such as $Mg(NO_3)_2$ or $MgCl_2$ with 2 moles of sodium orthosilicate, or it may be formed in situ in the aqueous solution of acid by the reaction of an alkali metal orthosilicate or metasilicate (or both) with magnesium oxide or magnesium hydroxide or both.

The magnesium compound may be either magnesium oxide or magnesium hydroxide, although magnesium hydroxide is preferred, and is most conveniently added to a stirred aqueous solution of one of the acids of the present invention before adding the metal silicate. The magnesium compound, when present, can be added as a solids admixture together with an alkali metal metasilicate or orthosilicate to provide a turbid hydrosol. When a magnesium compound is employed, it is preferable that magnesium hydroxide be dissolved first in the aqueous acid solution, followed by the addition of an aqueous solution of an alkali metal metasilicate to provide water-clear hydrosols. When hydrous magnesium silicate is employed as the metal silicate, the concentration of magnesium compound (magnesium oxide or magnesium hydroxide) may be zero, or a quantity of magnesium compound may be added up to a concentration of about 6.6 percent by weight of the total hydrosol composition in addition to the hydrous magnesium silicate.

Minor amounts of a boron compound such as boric oxide or boric acid are included in the hydrosol composition when it is desired to prepare coatings which are to be annealed in reducing atmospheres or when enhanced glossiness is desired. It has been found that the presence of one of said boron compounds up to a maximum of about 1% by weight expressed as $B_2O_3$ under these conditions functions to provide glossier and more uniformly distributed coatings with better dielectric properties and to prevent the sticking or welding of coiled steel sheet which is subject to high temperature annealing in a reducing atmosphere, i.e., an atmosphere containing hydrogen. However, if the annealing is carried out in an oxidizing atmosphere, then the boron compound is excluded from the hydrosol composition.

The concentration of phosphoric acid employed is that stoichiometric quantity which is required to react with either the alkali metal metasilicate or orthosilicate or hydrous magnesium silicate (or combinations thereof) to form silicic acid.

One process for surface coating the various substrates upon which the hydrosols of this invention will electroplate virtually instantaneously comprises: p1 1. Placing the article in a dip bath containing the hydrosol and maintaining a fixed hydrosol composition in the dip bath by continuously or intermittently replacing consumed hydrosol. The article may be cleaned prior to coating (if not already coated) by washing in dilute acid or alkali.

2. Passing the article to be coated through the dip bath at a constant rate and providing
proper drainage of wetted articles in order to avoid excess accumulations of liquor on the article surfaces.
3. Passing the article through a ventillated dryer where it is exposed to a temperature of about 700° F. for 30 seconds or the equivalent thereof.

The coating may be heat cured or annealed by exposing the article to a temperature of about 1500° F. or more for about 15 seconds, or a heating cycle equivalent thereto.

The coating procedure may be repeated if a thicker coating is desired from the same hydrosol composition, or the solids content of the composition can be increased.

Alternately the hydrosols of the present invention may be applied to a selected substrate by any suitable means such as by immersion, brushing, painting, or spraying. However, the aforesaid dip-bath technique has been found to be the most convenient, especially in the instance where a metal sheet is to be coated.

Although the acidic hydrosols of the present invention are described principally with reference to coatings on various steels, coated steels, and aluminum, a surprising and unexpected feature of said hydrosols is their ability to deposit virtually instantaneously and substantially uniformly on any substrate which consumes a minor quantity of acid from the hydrosol. It has been found, as set forth in the Examples hereinafter, that the instant hydrosols deposit a coating upon such diverse substrates as porcelain, glass, wood, paper, cotton, synthetic resins and hydrateable oxides. The term "hydrateable oxide" is here taken to mean any oxide which will form an insoluble hydroxide upon contact with water. One synthetic resin which was coated is that which is sold under the trademark Formica.

The term "coating" as used hereinafter means the composition formed on a steel surface by drying and/or heating the hydrosol at an elevated temperature. The term "insulation" as used herein, means the glassy composition formed when the coated article is dried, heat treated and annealed. The term "annealed" refers to a process whereby the steel is heated to about 1200° C. in an atmosphere of low dewpoint containing hydrogen, or in a vacuum, under programmed conditions with respect to time and temperature. This results in a growth in size of the steel grains and also in a specific grain orientation which provides the desired soft magnetic properties sought. The term "stress relief annealed" refers to a treatment following fabrication and box annealing for removing stresses resulting from deformation caused by cutting and flexing. This results in loss of magnetic properties that must be restored. This form of annealing is usually conducted around 815° C. in mildly oxidizing or reducing atmospheres. The term "base coated" refers to the semi-dielectric surface formed in the process of annealing. Base coatings primarily contain orthosilicates of iron and magnesium.

The normal process for the manufacture of an insulated grain-oriented electrical steel comprises the following steps: melting a suitable composition, casting this melt into an ingot, hot-rolling this ingot into a strip, annealing the hot-rolled strip, cold-rolling this strip to gauge, decarburizing the cold-rolled strip, coating the cold-rolled strip with a slurry of magnesia including drying the coating, providing a secondary anneal to develop ultimate magnetic properties, applying a secondary finished coating while simultaneously stress relief annealing. The steel at this point has a dielectric coating comprising a mixture of magnesium silicate and phosphate. In the fabrication of electrical devices, stresses are imparted to the steel which require a final stress relief anneal to restore magnetic properties.

The Conductance, i.e., insulation of the coated and annealed surface, is measured by means of the Franklin Test, and the Porosity of this surface is determined by means of the Copper Plating Test.

DESCRIPTION OF TESTS

Conductance (Franklin Test)

This test is widely accepted and utilized for evaluating the conductance of coated steel sheets. A detailed description is found in ASTM method A-334-52, "Standard Methods of Test for Electrical and Mechanical Properties of Magnetic Materials". Briefly, the test is carried out by passing an electric current through brass anodes which cover coated areas 0.1 square inch in area at 500 psi on the anode. Current passing through the coating flows through the steel to a contact made directly to the steel by means of a twist drill. The resulting amperage provides a measure of the resistance encountered through the coating. Several hundred contacts are employed in obtaining readings for coating evaluation. A complete short circuit, i.e., complete conductance, is indicated by reading of 100 milliamps per 0.1 square inch. Therefore, the lower the reading in milliamps the more insulating the coating. A Franklin value of zero indicates complete insulation. The Franklin values appearing in the Examples are reported as milliamps per 0.1 square inch.

Porosity (Copper Plating Test)

A steel sheet bearing a dried and annealed coating is immersed in an aqueous solution of copper sulfate. Copper spontaneously plates on the surfaces that are not electrically insulated, and therefore provides an indication of the Porosity of the annealed coating.

DESCRIPTION OF THE PREFERRED EMBODIMENTS

In one preferred form, an acidic hydrosol composition of the present invention is made by admixing on a weight basis from about 70 to about 85% water, from about 10 to about 20% by weight of phosphoric acid, from about 1 1/2 to 5% by weight of sodium silicate and from about 1 to about 3% by weight of magnesium hydroxide. If the hydrosol is to be used to coat silicon steel which will be stress relief annealed in a reducing atmosphere, then from about 0.02% to about 0.05% of boric oxide is included.

In another preferred form, the hydrosol composition is made by admixing on a weight basis from about 75-90% of water, 8-20% phosphoric acid and from about 2% to about 5% by weight of hydrous magnesium silicate.

For a complete understanding of the present invention, reference is now made to the following specific examples illustrating the hydrosols of the present invention and the properties of coatings made therefrom.

EXAMPLES 1-4

Hydrosols stable for at least 15 to 20 minutes were prepared by adding measured quantities of magnesium oxide and solium silicate to stirred quantities of aqueous phosphoric acid and maintaining the resulting hydrosols below a temperature of about 28° C. Successive hydrosols were prepared from fixed ratios of MgO and $Na_2SiO_3$ by progressively increasing the concentrations of sodium silicate and phosphoric acid. The compositions so produced are set forth in Table 1.

TABLE 1

| Example | WEIGHT PERCENT | | | | % $H_3PO_4$ in $H_2O$ | MOLE FRACTIONS | |
|---|---|---|---|---|---|---|---|
| | $H_3PO_4$ | $H_2O$ | MgO | $Na_2SiO_3$ | | $\frac{Na_2SiO_3}{Na_2SiO_3 + MgO}$ | $\frac{MgO}{MgO + Na_2SiO_3}$ |
| 1 | 11.8 | 77.2 | 0.6 | 10.4 | 13.3 | 0.85 | 0.15 |
| 2 | 13.2 | 75.2 | 0.5 | 11.1 | 14.9 | 0.88 | 0.12 |
| 3 | 17.8 | 73.1 | 1.1 | 8.0 | 19.6 | 0.71 | 0.29 |
| 4 | 50.5 | 42.9 | 1.5 | 5.1 | 54.0 | 0.52 | 0.48 |

EXAMPLES 5-10

Hydrosols stable for at least 15 to 20 minutes were prepared by adding magnesium oxide and sodium metasilicate to stirred quantities of aqueous phosphoric acid and maintaining the resulting hydrosols below a temperature of 28° C. Successive hydrosols were produced from fixed ratios of MgO and $Na_2SiO_3$ by progressively increasing the concentrations of MgO and $H_3PO_4$. The compositions so produced are set forth in Table 2.

TABLE 2

| Example | WEIGHT PERCENT | | | | %$H_3PO_4$ in $H_2O$ | Mole Fractions | |
|---|---|---|---|---|---|---|---|
| | $H_3PO_4$ | $H_2O$ | MgO | $Na_2SiO_3$ | | $\frac{Na_2SiO_3}{Na_2SiO_3 + MgO}$ | $\frac{MgO}{MgO + Na_2SiO_3}$ |
| 5 | 11.7 | 85.0 | 2.2 | 1.1 | 12.1 | 0.14 | 0.86 |
| 6 | 13.9 | 81.5 | 2.7 | 1.9 | 14.6 | 0.19 | 0.81 |
| 7 | 17.2 | 77.8 | 3.2 | 1.8 | 18.1 | 0.15 | 0.85 |
| 8 | 22.4 | 70.7 | 3.1 | 3.8 | 24.1 | 0.29 | 0.71 |
| 9 | 23.0 | 71.0 | 4.4 | 1.6 | 24.5 | 0.11 | 0.89 |
| 10 | 43.0 | 44.8 | 6.6 | 5.6 | 49.0 | 0.25 | 0.75 |

EXAMPLE 11

A hydrosol was prepared by admixing 1.98 g. of MgO, 5.77 g. of $Na_2SiO_3 \cdot 9H_2O$ and 0.046 g. of $B_2O_3$ into a stirred solution of 17.1 g. of 85% $H_3PO_4$ and 100 ml. of water. This hydrosol had the following composition:

|  | Gram | % by Weight |
|---|---|---|
| $H_2O$ | 100 | 84.06 |
| $H_3PO_4$ | 14.5 | 12.2 |
| MgO | 1.98 | 1.6 |
| $Na_2SiO_3$ | 2.48 | 2.1 |
| $B_2O_3$ | 0.046 | 0.04 |
|  | 119.006 | 100.00 |

This hydrosol was spontaneously coated on the substrates aluminum plate, nickel wire, porcelain spheres and carbon steel sheet respectively by dipping each substrate therein and drying the wet coatings at 700° F. for about 15 seconds to provide glossy coatings thereon. The coated substrates were examined for coating and appearance and color, coating weight, adherence and dielectric properties (as determined by the Franklin Test) where possible. The results are set forth in Table 3.

TABLE 3

| Substrate | Coating Weight g/cm2 | Coating Appearance and Color | Coating Adherence | Franklin Value |
|---|---|---|---|---|
| Aluminum Plate, 24 mils | .00039 | Uniform White | Strong | Zero[1]. |
| Nickel Wire 0.51" dia. | .00068 | Transparent | Strong | 2.[2] |
| Procelain Spheres | .00032 | Clear Glazed | Strong | 2.[2] |
| Carbon Steel Sheet | .00042 | Even Grey | Strong | Zero[1]. |

[1]A value of zero indicates complete insulation.
[2]The Franklin Test apparatus is not capable of measuring a wire or spherical surface. Porcelain already is a nonconductor.

EXAMPLE 12

A hydrosol was formed in the following manner using acetic acid instead of phosphoric acid and hydrous magnesium silicate instead of an admixture of magnesium oxide and sodium silicate:

Hydrous magnesium silicate was formed by adding 3.68 g. of an aqueous solution of $Na_4SiO_4$ to an aqueous solution containing 12.21 g. $MgCl_2 \cdot 6H_2O$. The resultant wet precipitate was washed and suspended in water. To this suspension, acetic acid was added to yield a pH of 5 and to form a clear hydrosol.

This hydrosol when coated onto silicon steel in the usual manner formed a coating thereon which was visible and provided insulation when dried.

EXAMPLE 13

The procedure of Example 12 was repeated except that 3 ml. of concentrated nitric acid was substituted for acetic acid. The resultant hydrosol, when coated onto silicon steel in the usual manner, formed a coating which was visible.

EXAMPLES 14–18

Hydrosols were prepared containing various concentrations of hydrous magnesium silicate, water and phosphoric acid by admixing these ingredients in the proportions set forth in Table 4.

TABLE 4

| Example | Hydrous Magnesium Silicate g. | Hydrous Magnesium Silicate % by Weight | 85% $H_3PO_4$ g. | 85% $H_3PO_4$ % by Weight | $H_2O$ g. | $H_2O$ % by Weight |
|---|---|---|---|---|---|---|
| 14 | 1.96 | 3.5 | 11.0 | 19.6 | 43.04 | 76.9 |
| 15 | 1.96 | 2.6 | 11.0 | 15.0 | 60.42 | 82.4 |
| 16 | 1.96 | 1.8 | 11.0 | 10.1 | 95.93 | 88.1 |
| 17 | 1.96 | 0.9 | 11.0 | 4.8 | 215.0 | 94.3 |
| 18 | 1.96 | 0.2 | 11.0 | 1.1 | 967.04 | 98.7 |

The hydrosols of Examples 14–18 were coated onto bare steel in various coating weights in the usual manner and the quality of each coating was evaluated with respect to Franklin value (insulation), coating uniformity and porosity (Copper Plating Test). The results are set forth in Table 5 and indicate that as little as 4.8 percent by weight of 85% phosphoric acid (4.08% of 100% phosphoric acid) and 0.9 percent by weight of hydrous magnesium silicate are operable to provide a hydrosol which forms an acceptable coating on bare steel (see Example 17), although the preferred hydrosol is that of Example 16.

TABLE 5

| | DRIED COATINGS | | | | |
|---|---|---|---|---|---|
| Example | g/cm2 × 104 | Thickness Mils. | Franklin | Porosity | Coating Uniformity |
| 14 | 28.0 | 3.0 | 0 | 0 | Streaky* |
| 15 | 11.0 | 1.5 | 0 | 0 | Streaky* |
| 16 | 1.5 | 0.12 | 0 | 0 | Good** |
| 17 | 1.1 | 0.008 | Nearly 0 | 0 | Fair-Good |
| 18 | 0 | 0 | Conducts | | |

*Acceptable
**Preferred

EXAMPLE 19

Successively lesser quantities of 85% phosphoric acid were added to aliquots of a hydrous magnesium silicate suspension in water containing 2.6% by weight of hydrous magnesium silicate. It was found that no less than 3.1 grams of 85% phosphoric acid per 1.44 grams of hydrous magnesium silicate is required to form a clear hydrosol. For hydrosol stability of several weeks, at least about 5–8 grams of 85% phosphoric acid per 1.44 grams of hydrous magnesium silicate are necessary, which represents from about 3 to 5 percent of 100% phosphoric acid, 1% of hydrous magnesium silicate and from about 96 to about 94% of water.

EXAMPLES 20–24

Various concentrations of boric oxide were added to a hydrosol containing 5.0 percent of hydrous magnesium silicate, 7.8% (85%) phosphoric acid and 87.2% water to provide boric oxide-containing hydrosols. Each of these hydrosols was coated onto bare steel and then subjected to stress relief annealing at 1600° F. in a reducing atmosphere containing 75% nitrogen and 25% hydrogen. These were exaggerated stress relief annealing conditions for detecting changes in the dielectrics, i.e., higher hydrogen concentrations and a higher than usual anneal temperature. Table 6 sets forth the results obtained with respect to insulation (Franklin values) and the easy separability of stacked laminated coated sheets after stress relief annealing.

TABLE 6

| Example | g. $B_2O_3$ per 100 g. Hydrosol | Separability | Franklin Value Absolute | Franklin Value Relative |
|---|---|---|---|---|
| 20 | 0.0115 | Good | 67 | 79 |
| 21 | 0.0230 | Good | 58 | 68 |
| 22 | 0.046 | Good | 53 | 62 |
| 23 | 0.918 | Good | 67 | 79 |
| 24 | 2.75 | Bad | 85 | 100 |

The foregoing results demonstrate that the addition of boron to the hydrosol of this invention in the range of from about 0.01 to about 1 gram of boron per 100 grams of hydrosol provides coatings which are insulating even after the rigors of exaggerated stress relief annealing in a reducing atmosphere.

EXAMPLES 25–28

A base hydrosol was prepared by admixing 109 grams of hydrous magnesium silicate suspension (containing 5% of hydrous magnesium silicate) with 15.3 grams of 85% phosphoric acid, 1.206 grams MgO and 0.05 gram of boric oxide, the initial constituents and proportions thereof being as follows:

| | % by Weight | Moles |
|---|---|---|
| Hydrous magnesium silicate | 5.0 | |
| 85% Phosphoric acid | 14.0 | 0.121 ($H_3PO_4$ basis) |
| Magnesium oxide | 1.1 | 0.027 |
| Boric oxide | 0.046 | |
| Water | 79.854 | |
| | 100.00 | |

Four successive hydrosols were prepared from this base hydrosol by adding thereto additional MgO and additional $H_3PO_4$ such that the number of moles of $MgHPO_4$ reaction product was increased by 50%, 75%, 100%, and 150% respectively over that present in the base hydrosol.

These hydrosols were coated onto bare steel in the usual manner and the coated steel was subjected to exaggerated stress relief annealing conditions at 1600° F. for 2 hours in a reducing atmosphere of 75% nitrogen and 25% hydrogen. The resultant annealed coatings were tested for their insulating properties (Franklin values) when compared with the coating made from the base hydrosol. The results are set forth in Table 7.

TABLE 7

| Example | % Increase in No. Moles of MgHPO4 | Franklin Values Observed | Franklin Values Relative |
|---|---|---|---|
| 25 | 50 | 84 | 100% |
| 26 | 75 | 82 | 98% |
| 27 | 100 | 43 | 51% |
| 28 | 150 | 55 | 65% |

EXAMPLE 29

The composition of Example 28 was coated onto a base coated silicon steel in the usual manner and then subjected to stress relief annealing at non-exaggerated conditions, i.e., at 1475° F. for 4 hours in a reducing atmosphere of 85% nitrogen and 15% hydrogen, annealing conditions that are typically employed at steel plants.

The Franklin values of the base coated steel and of the coated base coated steel after stress relief annealing were determined. In addition, the porosity was tested by the Copper Plating Test. The results were as follows:

| | Franklin Value | Porosity |
|---|---|---|
| A. Base Coated Silicon Steel | 30.7 | Non-porous |
| B. Coated Base Coated Silicon Steel After Stress Relief Annealing | 7.3 | Non-porous |
| Improvement of B over A | $\frac{(30.7-7.3)100}{30.7} = 76.2\%$ | |

EXAMPLES 30–32

Three different hydrosols were prepared as follows:

Example 30 — To 100 ml. water containing 17.1 grams of 85% phosphoric acid there were added 1.98 g. of MgO, 5.77 g. of $Na_2SiO_3 \cdot 9H_2O$ and 0.046 g. $B_2O_3$.

Example 31 — To 100 ml. of water containing 17.1 g. of 85% phosphoric acid there was added 5.77 g. of $Na_2SiO_3 \cdot 9H_2O$.

Example 32 — To 100 ml. of water containing 15.3 g. of 85% phosphoric acid there were added 1.21 g. MgO and 2.8 g. of hydrous magnesium silicate.

Each of the compositions of Examples 30, 31 and 32 was coated on to base coated silicon steel (containing aluminum nitride) from two different suppliers. These steels are here designated Types "A" and "B" respectively. After coating, the coated steels were stress relief annealed according to the procedure of Example 29. The Franklin values were determined on the base coated steel, on the coated base coated steel and on the stress relief annealed coated base coated steel. The results are set forth in Table 8 where the abbreviation "S.R.A." means Stress Relief Annealed.

TABLE 8

| Example | Type of Base Coated Steel | FRANKLIN VALUE Base Coated Steel | FRANKLIN VALUE Coated Base Coated Steel | FRANKLIN VALUE S.R.A. Coated Base Coated Steel | Improvement |
|---|---|---|---|---|---|
| 30 | A | 60 | 0 | 21 | $\frac{(60-21)}{60} \times 100 = 65\%$ |
| 31 | A | 61 | 0 | 25 | $\frac{(61-25)}{61} \times 100 = 59\%$ |
| 31 | B | 44 | 0 | 18 | $\frac{(44-18)}{44} \times 100 = 59\%$ |
| 32 | B | 43 | 0 | 16 | $\frac{(43-16)}{43} \times 100 = 63\%$ |

The foregoing data show that the absence of MgO from the hydrosol composition (Example 31), in the instance where the metal silicate is sodium silicate, results in a smaller improvement in the Franklin value of the resultant coating after stress relief annealing than when MgO is present (Example 30). The indicated combination of hydrous magnesium silicate and MgO (Example 32 ) provides a hydrosol which gives a Franklin value comparable to that of the composition of Example 30.

EXAMPLES 33-37

To determine whether orthosilicates and metasilicates are both operable in the present invention, the hydrosol composition of Example 30 was varied by adding thereto various combinations of $Na_4SiO_4$ and $Na_2SiO_3$ to mole ratios of orthosilicate to metasilicate ranging as set forth in Table 9. Table 9 also tabulates the Franklin values obtained after coating the resultant hydrosols on to base coated silicon steel and thereafter stress relief appealing when compared with the Franklin values of the original base coated steel.

TABLE 9

| | | | Franklin | | |
|---|---|---|---|---|---|
| | Mole Ratio of Sodium Silicates | | Orig. Base Coated | Aft. Treated and | Aft. Treating and S.R.A. Percent |
| Example | Ortho | Meta | Steel | S.R.A. | Improvement |
| 33 | All | 0 | 68.5 | 18.0 | 74 |
| 34 | 1 | 1 | 59.0 | 8.9 | 85 |
| 35 | 1 | 3 | 58.3 | 3.8 | 93 |
| 36 | 1 | 5 | 63.9 | 7.3 | 89 |
| 37 | 0 | All | 56.6 | 12.0 | 79 |

The foregoing results show that the metal silicate content of the present hydrosols may be all orthosilicate, or all metasilicate, or that various ratios of orthosilicate and metasilicate are effective in causing significant improvement in the Franklin values of the stress relief annealed coatings.

EXAMPLES 38-40

Bare grain oriented steel and bare non-grain oriented steel were cleaned by dipping in 37% hydrochloric acid for one minute followed by rinsing with water. In addition, a separate specimen of bare non-grain oriented steel was cleaned by dipping in a 25% sodium hydroxide solution for 1 minute followed by rinsing with water. Each of these pre-cleaned bare non-grain oriented steels was coated with the hydrosol composition of Example 30 in the usual manner and dried at 700° F.; the coated pre-cleaned bare grain-oriented steel was cured at 1500° F.

The Franklin values were determined on the specimens so coated after stress relief annealing. A second coating was then applied over the first coating, stress relief annealed, and then tested for Franklin value. The results are set forth in Table 10, where "G.O." means "grain-oriented", and where "N.G.O." means "non-grained oriented".

TABLE 10

| Example | Type Steel | Single or Double Coated | Franklin After S.R.A. | Improvement by Double Coating |
|---|---|---|---|---|
| 38 | G.O. | Single | 65 | $\frac{(65-28)}{65} \cdot 100 = 57\%$ |
| | | Double | 28* | |
| 39 | N.G.O. | Single | 63 | $\frac{(63-41)}{63} \cdot 100 = 35\%$ |
| | | Double | 41 X | |
| 40 | N.G.O.# | Single | 70 | $\frac{(70-55)}{70} \cdot 100 = 21\%$ |
| | | Double | 55 X | |

*Second coating deposited on a 1500° F. cured coating.
X Second coating deposited on the 700° F. dried coating.
Steel cleaned with NaOH dip; surfaces are readily wet by hydrosol.
Steel cleaned with HCl dip; surfaces are not as readily wet by hydrosol.

EXAMPLE 41

The hydrosol composition of Example 30 was coated onto one half of a base coated silicon steel specimen in the usual manner. The other half of the specimen was not coated. The steel so prepared was exposed to the atmosphere for nine months, after which time it was examined. It was found that the coated half was glossy and uncorroded, whereas the non-coated half of the steel specimen was badly rusted.

EXAMPLE 42

The hydrosol was prepared by the same procedure as described in Example 11. Base coated 15 × 3 cm silicon steel strips were coated with this hydrosol and dried as previously described. The steel before and after coatings was then weighed. The coated strips were stacked and then subjected to a stress relief anneal at 1600° F. for 4 hours in 15% $H_2$ + 85% $N_2$. The finished annealed coatings were also tested for Franklin levels.

The experiment was then repeated using commercially produced base and phosphate coated steel strips of the same dimensions. The results were as follows:

| Type Treated Steel | Loss in Weight After Annealing g./cm² × 10⁶ | Franklin Level After Stress Relief Annealing |
|---|---|---|
| Base Coated Silicon Steel With One Coat From Hydrosol | 0 | 1.5 |
| Base Coated Silicon Steel With Double Coat From Hydrosol | 30 | 6.7 |
| Base and Phosphate Coated Silicon Steel | 235 | 5.3 |

The above shows that while all coatings retained acceptable dielectric properties after stress relief annealing, the commercial base and phosphate coated steel lost substantially more weight on stress relief annealing than did the base coated steel containing one coat from the hydrosol. Since the commercial base and phosphate coated steel retained good dielectrics, the hydrosol coating must have remained on the steel and not volatilized. Consequently, the weight loss of the base and phosphate-coated steel must have been due to a loss of water as the phosphate coating converted to the pyrophosphate or phosphide form. This loss of weight can have a deleterious effect on the magnetic qualities of the substrate. The foregoing results show that the coating formed from the present hydrosol does not lose water upon annealing at a temperature up to 1600° F.

EXAMPLE 43

A hydrosol was prepared by the same procedure as described in Example 11. Base coated 15 × 3 cm. silicon steel strips were coated with this hydrosol and dried as previously described. The coated strips were stacked and then subjected to an intense stress relief anneal at 1800° F. for 4 hours in an atmosphere consisting of 15% $H_2$ + 85% $N_2$. The Franklin level after stress relief annealing was measured.

Following the above treatment, the strips were recoated with the hydrosol composition and dried. The Franklin level of the recoated and dried strips was then remeasured. The results were as follows:

| | Franklin | |
|---|---|---|
| No. of Coatings Prior to S.R.A. | After Intense S.R.A. | Recoated S.R.A. Strips |
| One | 47.1 | 1.0 |
| Two | 43.2 | 3.1 |

These results show that coated, dried and intensely stress relief annealed steel can be recoated with the hydrosol of this invention to restore good dielectric coating properties. All strips were easily separable from the stack after 1800° F. annealing.

EXAMPLE 44

Three aluminum strips were immersed for 2 seconds, 30 seconds and 60 seconds, respectively, in a bath consisting of the hydrosol composition of Example 11. Each strip was removed from the bath and dried at 700° F. for 30 seconds. The weight of coating on each strip was determined by weighting the strips before and after coating. The results were as follows:

| Immersion Time | Dried Coating Weight (g./cm$^2$) |
|---|---|
| 2 Seconds | 0.0003 |
| 30 Seconds | 0.0004 |
| 60 Seconds | 0.0004 |

This demonstrates that the coating weight remains essentially fixed and is independent of the time of contact between the substrate and the hydrosol.

EXAMPLES 45–47

Three aluminum sheets, each having a thickness of about 0.008 inch, were degreased by contact with dilute hypochloric acid for 10 seconds and then immersed in a bath containing the hydrosol of Example 11. Each sheet was removed from the bath and dried at 700° F. for 30 seconds. One sheet was reimmersed and redried to receive a second coating. In addition, one of the dried sheets with a single coat was "cured" by heating at 1000° F. for 15 seconds. The coating weights were determined, the coating appearance was noted and the Franklin values were obtained. In addition, each coated strip was subjected to a bend test which consists of bending the strip 180° around a 2 cm. diameter mandrel. The results obtained were as follows:

| Example | No. of Coats | Cured at 1000° F. - 15 Sec. | Coating Weight g./cm2 | Coating Appearance | Franklin Value | Bend Test |
|---|---|---|---|---|---|---|
| 45 | 1 | No | 0.00036 | Uniform | 3.5 | No effect |
| 46 | 2 | No | 0.00063 | Uniform | 0 | No effect |
| 47 | 1 | Yes | 0.00036 | Uniform | 0 | No effect |

EXAMPLE 48

The hydrosol of Example 11 was coated onto a flat wood substrate and then dried at 110° C. for 5 minutes. Two more coatings were applied in the same manner for a total three coats of hydrosol. It was determined that the total coating weight was 0.005 g./cm$^2$. even though no coating was visible. The coating had the effect of preventing the wood from curling when subjected to the drying temperature.

EXAMPLE 49

The procedure of Example 48 was followed, except that the substrate was white paper. The total coating weight was 0.0012 g./cm$^2$. The effect of the coating was to stiffen the paper and to render it nonsupportive of combustion.

EXAMPLE 50

The procedure of Example 48 was followed, except that the substrate was cotton and the drying time was 10 minutes instead of 5 minutes. The total coating weight was 0.0021 g/cm$^2$. The effect of the coating was to stiffen the cotton and to render it nonsupportive of combustion.

EXAMPLE 51

The procedure of Example 48 was followed, except that the substrate was a synthetic resin commercially available under the trademark Formica. The total coating weight was 0.0013 g./cm$^2$ and provided a duller finish to the surface of the plastic.

EXAMPLE 52

The procedure of Example 48 was repeated, except that the substrate was glass and two coatings were placed thereon instead of three. The total coating weight was 0.0009 g./cm$^2$ and the coating was clearly visible on the glass.

EXAMPLE 53

The procedure of Example 48 was repeated, except that the substrate was 3 grams of aluminum oxide, a hydrateable oxide, and only one coating was applied. The coating weight was 0.8219 g. per 3 grams of aluminum oxide. The coating was not visible.

I claim:

1. An acidic hydrosol composition consisting essentially of the initial constituents water, an acid selected from the group consisting of phosphoric acid, nitric acid, hydrochloric acid and acetic acid, a metal silicate selected from the group consisting of alkali metal metasilicates having the formula $M_2SiO_3$, alkali metal orthosilicates having the formula $M_4SiO_4$, where M is sodium or potassium, and hydrous magnesium silicate, magnesium compound selected from the group consisting of magnesium oxide and magnesium hydroxide, and a boron compound selected from the group consisting of boric oxide and boric acid, wherein said constituents are present in the following proportions:

| Constituent | Percent by Weight |
|---|---|
| (A) Water | About 43 to about 94 |
| (B) Acid | About 3 to about 51 |
| (C) Alkali metal metasilicate | 0 to about 16 |
| (D) Alkali metal orthosilicate | 0 to about 16 |
| (E) Hydrous magnesium silicate | 0 to about 18 |
| (F) Magnesium compound | 0 to about 6.6 |
| (G) Boron compound | 0 to about 1 | wherein:
when (C) is O, then (D) is at least 1% and (F) is at least about 0.5%;
when (D) is O, then (C) is at least 1% and (F) is at least about 0.5%;
when both (C) and (D) are O, then (E) is at least about 0.9%;
when (C) and (E) are each zero, then (D) is at least 1% and (F) is at least 0.5%;

when (D) and (E) are each zero, then (C) is at least 1% and (F) is at least 0.5%;
when (C) is zero, then (D) is greater than zero but less than 1% when (E) is at least 0.9%;
when (D) is zero, then (C) is greater than zero but less than 1% when (E) is at least 0.9%;
the concentration of acid is at least the stoichiometric quantity required to react with either (C), (D) or (E), or with mixtures thereof to form silicic acid; and the ratio of $M_2O$ to $SiO_2$ is from about 1:1 to about 2:1 in said alkali metal metasilicates and orthosilicates.

2. The hydrosol of claim 1 wherein the acid is phosphoric acid, the metal silicate is sodium metasilicate, the magnesium compound is magnesium oxide, and the concentration of each of the constituents (D), (E) and (G) is zero.

3. The hydrosol of claim 1 wherein the acid is phosphoric acid, the metal silicate is sodium metasilicate, the magnesium compound is magnesium hydroxide, and the concentration of each of the constituents (D), (E) and (G) is zero.

4. The hydrosol of claim 1 wherein the acid is phosphoric acid, the metal silicate is sodium orthosilicate, the magnesium compound is magnesium oxide, and the concentration of each of the constituents (C), (E), and (G) is zero.

5. The hydrosol of claim 1 wherein the acid is phosphoric acid, the metal silicate and hydrous magnesium silicate, and the concentration of each of the constituents (C), (D), (F) and (G) is zero.

6. The hydrosol of claim 1 wherein the acid is phosphoric acid, the metal silicate is hydrous magnesium silicate, the magnesium compound is magnesium oxide, and concentration of each of the constituents (C), (D) and (G) is zero.

7. The hydrosol of claim 1 wherein the acid is phosphoric acid, the metal silicate is hydrous magnesium silicate and the magnesium compound is magnesium hydroxide, and the concentration of each of the constituents (C), (D) and (G) is zero.

8. The hydrosol of claim 1 wherein the acid is phosphoric acid, the metal silicate is sodium metasilicate, the magnesium compound is magnesium oxide and the boron compound is boric oxide, and wherein the proportions thereof are as follows:

|  | Percent by Weight |
| --- | --- |
| Water | 70 to 85 |
| Phosphoric acid | 10 to 20 |
| Sodium metasilicate | 1 to 16 |
| Magnesium oxide | 1 to 5 |
| Boric oxide | 0.02 to 1, | and the concentration of each of the constituents (D) and (E) is zero.

9. The hydrosol of claim 1 wherein the acid is phosphoric acid and the metal silicate is hydrous magnesium silicate, and wherein the proportions thereof are as follows:

|  | Percent by Weight |
| --- | --- |
| Water | 70 to 85 |
| Phosphoric acid | 10 to 20 |
| Hydrous Magnesium Silicate | 1 to 12, | and the concentration of each of the constituents (C), (D), (F) and (G) is zero.

10. The hydrosol of claim 1 wherein the acid is phosphoric acid, the metal silicate is hydrous magnesium silicate, the magnesium compound is magnesium oxide and the boron compound is boric oxide, and wherein the proportions thereof are as follows:

|  | Percent by Weight |
| --- | --- |
| Water | 70 to 85 |
| Phosphoric acid | 5 to 20 |
| Hydrous magnesium silicate | 1 to 5 |
| Magnesium oxide | 1 to 5 |
| Boric oxide | 0.01 to 1 | and the concentration of each of the constituents (C) and (D) is zero.

11. A process for depositing an electrically insulating and corrosion resistant coating from an acidic hydrosol onto a substrate which consumes a minor quantity of acid from said hydrosol, said substrate being selected from the group consisting of metals higher than hydrogen in the electromotive series, porcelain, glass, wood, paper, cotton, plastics and hydrateable oxides, said process comprising forming an acidic hydrosol as defined in claim 1, contacting said hydrosol with said substrate to form a coating thereon and heating said coated substrate to dry said coating thereon.

12. The process of claim 11 wherein the substrate is silicon steel.

13. The process of claim 11 wherein the substrate is carbon steel.

14. The process of claim 11 wherein the substrate is aluminum.

15. The process of claim 11 wherein the substrate is porcelain.

16. The process of claim 11 wherein the substrate is glass.

17. The process of claim 11 wherein the substrate is wood.

18. The process of claim 11 wherein the substrate is paper.

19. The process of claim 11 wherein the substrate is cotton.

20. The process of claim 11 wherein the substrate is a synthetic resin.

21. The process of claim 11 wherein the substrate is silicon steel and the hydrosol is formed from the constituents water, phosphoric acid, sodium metasilicate, magnesium hydroxide and boric oxide in the following proportions:

| Constituent | Percent by Weight |
| --- | --- |
| Water | 70 to 85 |
| Phosphoric acid | 10 to 20 |
| Sodium metasilicate | 1 to 16 |
| Magnesium hydroxide | 1 to 5 |
| Boric oxide | 0.02 to 1, | and the dried coating is thereafter annealed at a temperature of from about 1200° F. to about 1600° F.

22. The process of claim 11 wherein the substrate is silicon steel and the hydrosol is formed from the constituents water, phosphoric acid, and hydrous magnesium silicate in the following proportions:

| Constituent | Percent by Weight |
| --- | --- |
| Water | 70 to 85 |
| Phosphoric acid | 10 to 20 |
| Hydrous magnesium silicate | 1 to 18. |

23. The process of claim 11 wherein the substrate is silicon steel and the hydrosol is formed from the constituents water, phosphoric acid, hydrous magnesium silicate, magnesium oxide and boric oxide in the following proportions:

| Constituent | Percent by Weight |
| --- | --- |
| Water | 70 to 85 |
| Phosphoric acid | 10 to 20 |
| Hydrous magnesium silicate | 1 to 5 |
| Magnesium oxide | 1 to 5 |
| Boric oxide | 0.01 to 1. |

24. The process of claim 11 wherein the substrate is silicon steel and the hydrosol is formed from the constituents water, phosphoric acid, hydrous magnesium silicate, magnesium hydroxide and boric oxide in the following proportions:

| Constituent | Percent by Weight |
| --- | --- |
| Water | 70 to 85 |
| Phosphoric acid | 10 to 20 |
| Hydrous magnesium silicate | 1 to 5 |
| Magnesium hydroxide | 1 to 5 |
| Boric oxide | 0.01 to 1. |

25. The process of claim 11 wherein the substrate is aluminum and the hydrosol is formed from the constituents water, phosphoric acid, sodium metasilicate, magnesium oxide and boric oxide in the following proportions:

| Constituent | Percent by Weight |
| --- | --- |
| Water | 70 to 85 |
| Phosphoric acid | 10 to 20 |
| Sodium metasilicate | 1 to 16 |
| Magnesium oxide | 1 to 5 |
| Boric oxide | 0.02 to 1, | and the dried coating is thereafter annealed at a temperature of about 1200° F.

26. The process of claim 11 wherein the substrate is aluminum and the hydrosol is formed from the constituents water, phosphoric acid, sodium metasilicate, magnesium hydroxide and boric oxide in the following proportions:

| Constituent | Percent by Weight |
| --- | --- |
| Water | 70 to 85 |
| Phosphoric acid | 10 to 20 |
| Sodium metasilicate | 1 to 16 |
| Magnesium hydroxide | 1 to 5 |
| Boric oxide | 0.02 to 1, | and the dried coating is thereafter annealed at a temperature of about 1200° F.

27. The process of claim 11 wherein the substrate is aluminum and the hydrosol is formed from the constituents water, phosphoric acid, and the hydrous magnesium silicate in the following proportions:

| Constituent | Percent by Weight |
| --- | --- |
| Water | 70 to 85 |
| Phosphoric acid | 10 to 20 |
| Hydrous magnesium silicate | 1 to 18. |

28. The process of claim 11 wherein the substrate is aluminum and the hydrosol is formed from the constituents water, phosphoric acid, hydrous magnesium silicate, magnesium oxide and boric oxide in the following proportions:

| Constituent | Percent by Weight |
| --- | --- |
| Water | 70 to 85 |
| Phosphoric acid | 10 to 20 |
| Hydrous magnesium silicate | 1 to 5 |
| Magnesium oxide | 1 to 5 |
| Boric oxide | 0.01 to 1. |

29. The process of claim 11 wherein the substrate is aluminum and the hydrosol is formed from the constituents water, phosphoric acid, hydrous magnesium silicate, magnesium hydroxide and boric oxide in the following proportions:

| Constituent | Percent by Weight |
| --- | --- |
| Water | 70 to 85 |
| Phosphoric acid | 10 to 20 |
| Hydrous magnesium silicate | 1 to 5 |
| Magnesium hydroxide | 1 to 5 |
| Boric oxide | 0.01 to 1. |

30. A process for preparing an acidic hydrosol capable of depositing an electrically insulating and corrosion resistant coating onto a substrate which consumes a minor quantity of acid from said hydrosol, said substrate being selected from the group consisting of metals higher than hydrogen in the electromotive series, porcelain, glass, wood, paper, cotton, synthetic resins and hydrateable oxides, said process consisting essentially of admixing water with an acid selected from the group consisting of phosphoric acid, nitric acid, hydrochloric acid and acetic acid to form an aqueous acidic solution, and admixing with said solution until homogeneous a metal silicate selected from the group consisting of alkali metal metasilicates having the formula $M_2SiO_3$, alkali metal orthosilicates having the formula $M_4SiO_4$, where M is sodium or potassium, and hydrous magnesium silicate, a magnesium compound selected from the group consisting of magnesium oxide and magnesium hydroxide, and a boron compound selected from the group consisting of boric oxide and boric acid, wherein the proportions of said water, acid, metal silicate, magnesium compound and boron compound are as follows:

| | Percent by Weight |
| --- | --- |
| (A) Water | About 43 to about 94 |
| (B) Acid | About 3 to about 51 |
| (C) Alkali metal metasilicate | 0 to about 16 |
| (D) Alkai metal orthosilicate | 0 to about 16 |
| (E) Hydrous magnesium silicate | 0 to about 18 |
| (F) Magnesium compound | 0 to about 6.6 |
| (G) Boron compound | 0 to about 1 | wherein :

when (C) is zero, then (D) is at least 1% and (F) is at least 0.5%;
when (D) is zero, then (C) is at least 1% and (F) is at least 0.5%;
when both (C) and (D) are each zero, then (E) is at least about 0.9%;
when both (C) and (E) are each zero, then (D) is at least 1% and (F) is at least 0.5%;
when (D) and (E) are each zero, then (C) is at least 1% and (F) is at least 0.5%;
when (C) is zero, then (D) is greater than zero but less than 1% when (E) is at least 0.9%;
when (D) is zero, then (C) is greater than zero but less than 1% when (E) is at least 0.9%;
the concentration of acid is at least the stoichiometric quantity required to react with either (C), (D) or (E), or with mixtures thereof to form silicic acid; and the ratio of $M_2O$ to $SiO_2$ is from about 1:1 to about 2:1 in said alkali metal metasilicates and orthosilicates.

31. The process of claim 30 wherein the substrate is silicon steel the acid is phosphoric acid, the metal silicate is sodium metasilicate, and the magnesium compound is magnesium hydroxide in the following proportions:

|  | Percent by Weight |
| --- | --- |
| Water | 70 to 85 |
| Phosphoric acid | 10 to 20 |
| Sodium metasilicate | 1 to 16 |
| Magnesium hydroxide | 1 to 5. |

32. The process of claim 30 wherein the substrate is silicon steel, the acid is phosphoric acid, the metal silicate is sodium metasilicate and the magnesium compound is magnesium oxide in the following proportions:

|  | Percent by Weight |
| --- | --- |
| Water | 70 to 85 |
| Phosphoric acid | 10 to 20 |
| Sodium metasilicate | 1 to 16 |
| Magnesium oxide | 1 to 5. |

33. The process of claim 30 wherein the substrate is silicon steel, the acid is phosphoric acid, the metal silicate is sodium metasilicate, the magnesium compound is magnesium hydroxide and the boron compound is boric oxide in the following proportions:

|  | Percent by Weight |
| --- | --- |
| Water | 70 to 85 |
| Phosphoric acid | 10 to 20 |
| Sodium metasilicate | 1 to 16 |
| Magnesium hydroxide | 1 to 5 |
| Boric oxide | 0.01 to 1. |

34. The process of claim 30 wherein the substrate is silicon steel, the acid is phosphoric acid and the metal silicate is hydrous magnesium silicate in the following proportions:

|  | Percent by Weight |
| --- | --- |
| Water | 70 to 85 |
| Phosphoric acid | 10 to 20 |
| Hydrous magnesium silicate | 1 to 18. |

35. The process of claim 30 wherein the substrate is silicon steel, the acid is phosphoric acid, the metal silicate is hydrous magnesium silicate, the magnesium compound is magnesium hydroxide and the boron compound is boric oxide in the following roportions:

|  | Percent by Weight |
| --- | --- |
| Water | 70 to 85 |
| Phosphoric acid | 10 to 20 |
| Hydrous magnesium silicate | 1 to 5 |
| Magnesium hydroxide | 1 to 5 |
| Boric oxide | 0.01 to 1. |

36. A coated silicon steel sheet having thereon an adhered coating formed from the hydrosol defined in claim 1.

* * * * *